US006782916B2

(12) United States Patent  
Svendsen et al.

(10) Patent No.: US 6,782,916 B2
(45) Date of Patent: Aug. 31, 2004

(54) FLAPPER VALVE SYSTEM

(75) Inventors: Darrel J. Svendsen, Racine, WI (US); Kenneth Daniels, Salem, WI (US)

(73) Assignee: Case Corporation, Racine, WI (US)

( * ) Notice: Subject to any disclaimer, the term of this patent is extended or adjusted under 35 U.S.C. 154(b) by 147 days.

(21) Appl. No.: 10/033,956

(22) Filed: Dec. 20, 2001

(65) Prior Publication Data

US 2003/0116192 A1 Jun. 26, 2003

(51) Int. Cl.$^7$ .............................. F16K 15/03; F16K 1/18
(52) U.S. Cl. ................... 137/527.8; 137/527; 251/298
(58) Field of Search ................................. 251/298, 301

(56) References Cited

U.S. PATENT DOCUMENTS

| | | | | |
|---|---|---|---|---|
| 2,729,238 A | * | 1/1956 | Hite | 137/515.7 |
| 4,279,403 A | * | 7/1981 | Hobson | 137/527 |
| 4,702,274 A | * | 10/1987 | Kramer | 137/855 X |
| 5,285,816 A | * | 2/1994 | Herlihy | 137/856 |

* cited by examiner

Primary Examiner—Kevin Lee
(74) Attorney, Agent, or Firm—John William Stader; Collin A. Webb

(57) ABSTRACT

A fuel system for a work vehicle such as a tractor includes a pair of fuel tanks located on either side of the vehicle that are connected by a cross feed fuel line. The fuel line permits fuel to flow from both tanks to a common fuel suction line, which, in turn, feeds the vehicle's engine with fuel. The fuel line includes a check valve that prevents the free flow of fluid through the cross feed line when the vehicle is driven across a slope. The check valve is disposed to prevent liquid fuel from flowing away from a fuel suction line and starving the suction line for fuel.

8 Claims, 4 Drawing Sheets

FLAPPER VALVE SYSTEM

FIELD OF THE INVENTION

The invention relates generally to fuel systems for work vehicles. More particularly, it relates to check valves in such fuel systems to control the flow of fuel between a plurality of tanks.

BACKGROUND OF THE INVENTION

Many work vehicles such as tractors, combines, graders, backhoes and the like are made to operate on uneven ground. In addition, these vehicles often have a plurality of fuel tanks that are coupled together to provide fuel from more than one source to the engine of the vehicle.

In one common arrangement, fuel tanks are located on opposing sides of the vehicle rather than in a front and rear arrangement. One of the problems with this arrangement, especially when the fuel tanks are coupled by a cross feed line that permits fluid to flow freely between them, is that all the fuel flows to the lower of the two tanks away from the fuel suction line that carries fuel to the engine. When the fuel suction line is not immersed in fuel, no fuel gets to the engine, and the vehicle's engine dies because of fuel starvation.

When the work vehicle travels along the side of a field, it tilts to one side or the other. When the fuel tanks are arranged with one tank on one side of the vehicle and the other tank on the other side, this tilted orientation causes the fuel tank on the uphill side of the work vehicle to be elevated above that of the fuel tank on the downhill side of the work vehicle. This can raise one tank above the other by as much as 1 or 2 feet.

In many work vehicles, a cross feed line is provided between the two tanks and a fuel pickup or suction line is disposed in one tank. A fuel pump sucks fuel from the tanks through this open-ended suction line and sends it to the engine of the work vehicle. The cross feed line is typically coupled to the fuel tanks at the bottom of the fuel tanks to permit fuel to flow from side to side and from tank to tank as the fuel is consumed to keep the level of fuel in each tank the same.

When the vehicle tilts, however, and the fuel level is low, one tank and a portion of the cross feed line is elevated with respect to the other tank. As a result, gravity causes fuel to flow to the low tank. If the angle of tilt is sufficiently great, this forms a puddle of fuel, as much as several gallons, in the low tank.

This causes the fuel suction line to lose liquid suction and suck only vapor instead of the liquid fuel itself. When this happens, fuel pressure drops and the engine is starved for fuel.

If the operator immediately returns to level ground, the level of the tanks is equalized and the remaining fuel again submerges the fuel suction line in the one tank. Fuel flow is restored to the engine and the vehicle continues operating. On the other hand, if the work vehicle travels an extended distance in this tilted position, the engine, starved for fuel, will die and the vehicle can become stranded in spite of the fact that there are several gallons of fuel left in the low tank.

Work vehicles such as tractors often cultivate fields that are often disposed at an angle. For this reason, fuel starvation is a particular problem for tractors and other cultivating equipment. Typically, however, tractors and similar field cultivating vehicles periodically reverse directions and retrace their paths as they travel back and forth from headland to headland through a field. When they reverse directions and proceed back in the opposite direction along the same slope, the low tank becomes the high tank and the high tank becomes the low tank. As a result, fuel that previously pooled in the low tank flows through the cross feed line and pools in the erstwhile high tank. This periodic reversal of direction and consequent reversal of vehicle angle insures that the small amount of fuel remaining in the fuel system moves back and forth every few minutes from tank to tank. This mode of operation can be used to insure that fuel is always available to the engine if fuel that pools around the fuel suction line is prevented from flowing back away from the suction line.

What is needed, therefore, is an apparatus for regulating the gravitational flow of fuel through a cross feed line coupling to fuel tanks that are laterally disposed in a work vehicle. What is also needed is a method of preventing fuel from flowing from a high tank to a low tank when a work vehicle with two laterally disposed fuel tanks is driven across a slope. What is also needed is an apparatus for a fuel system that will prevent gravitational forces from acting on the fuel level in those tanks from moving the fuel through a cross feed line to a tank that is disposed below a fuel suction line thereby starving the fuel suction line for fuel.

It is an object of this invention to provide such an apparatus as part of a fuel system for a work vehicle.

SUMMARY OF THE INVENTION

In accordance with the first embodiment of the invention a fuel tank system for work vehicles is provided that includes a first fuel tank having a first fuel outlet disposed on the lower portion thereof, a second fuel tank having a second fuel outlet disposed on the lower portion thereof, a cross feed line having an inner diameter and coupled to and between the first and second outlets, and a check valve disposed in the cross feed line to block fuel from flowing through the cross feed line from the second tank to the first tank. The check valve may include an annulus having an outer diameter and defining a circular opening, and a valve element pivotally coupled to the annulus and sized to seal against and block the circular opening in a first pivotal position and to open the circular opening in a second pivotal position. The annulus may define a generally circular sealing surface disposed about a circumference thereof and the valve element may define a generally circular sealing surface disposed about the periphery thereof and configured to abut and seal against the generally circular sealing surface of the annulus. The fuel tank system may further include a clamp extending around the outer periphery of the cross feed line and disposed to compress the cross feed line against the annulus. The valve element may include a substantially planar and circular polymeric sheet having an upper portion, a lower portion, and a polymeric hinge portion formed integral with and coupling the upper and lower portions. The valve element may also include at least one planar stiffener sheet fixed to the lower portion of the circular polymeric sheet. The stiffener sheet may be substantially coplanar with the lower portion and may be fixed to one side of the lower portion. The upper portion of the annulus may have a radial thickness greater than a lower portion of the annulus, wherein the greater thickness is sufficient to anchor the upper portion of the circular polymeric sheet to the annulus. The upper portion of the circular polymeric sheet may be coupled to the upper portion of the annulus by at least one fastener. The valve element may be disposed to open in response to pressure provided by the weight of fuel by the first tank acting against the valve element and further wherein the valve element may be disposed to close in response to the weight of fuel from the second tank acting against the valve element.

In accordance with the second embodiment of the invention a flapper valve for fuel tank system is disclosed that includes a polymeric annulus having a width in an axial direction greater than its thickness in a radial direction, and a generally planar valve element including an upper portion fixed to the annulus and a lower portion configured to pivot in respect to the annulus, thereby providing a fluid passageway between the annulus and the valve element. The valve element may include a substantially planar and circular polymeric sheet having an upper portion, a lower portion, and a polymeric hinge portion formed integral with and coupling the upper and lower portions. The valve element may also include at least one planar stiffener sheet fixed to the lower portion of the circular polymeric sheet. The stiffener sheet may be substantially coplanar with the lower portion and may be fixed to one side of the lower portion. An upper portion of the annulus may have a radial thickness greater than a lower portion of the annulus wherein the greater thickness is sufficient to anchor the upper portion of the circular polymeric sheet to the annulus. The upper portion of the circular polymeric sheet may be coupled to the upper portion of the annulus by at least one fastener. The valve may also include a second stiffener sheet fixed to the lower portion of the polymeric sheet on an opposing side of the stiffener sheet. An outer edge of the second stiffener sheet may overlap the inner diameter of the annulus on one end thereof to thereby compress an outer circumferential edge of the polymeric sheet against the one end of the annulus.

DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE INVENTION

Figure 1:
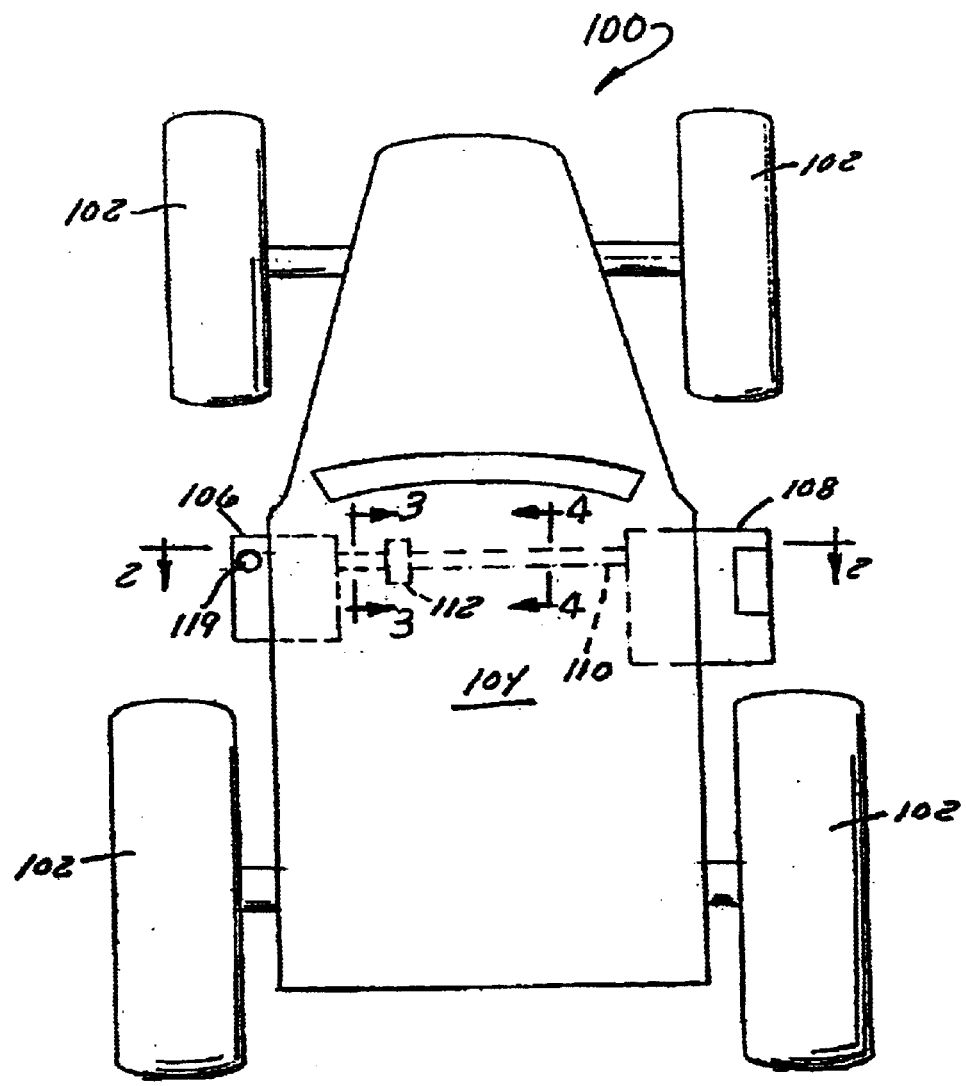
FIG. 1 is a plan view of a work vehicle, here shown as a tractor, having laterally disposed fuel tanks coupled together by a gravitationally fed cross feed line in accordance with the present invention.

Referring now to FIG. 1, a work vehicle 100 is shown, illustrated here as an agricultural tractor. The tractor includes four ground engaging wheel or tracks 102 that support the vehicle and propel it over the ground. An operator station 104 is located in a central part of the vehicle. Two fuel tanks 106 and 108 are coupled to the tractor's frame or chassis and are laterally offset—disposed in a side-to-side relationship—on tractor 100. The fuel tanks 106, 108 are generally disposed in a central portion of the vehicle, and are located underneath the operator's cabin between the cabin and the ground.

Fuel tanks 106 and 108 are fluidly coupled by a cross feed line 110 which is attached to both fuel tank 106 and fuel tank 108. A fuel check valve 112 is located in cross feed line 110 to limit fuel flow from fuel tank 108 to fuel tank 106. Tank 106 includes a fuel fill inlet 114 located near or at the top of tank 106. A cap is generally provided on this inlet 114 to contain the fuel. This cap can be removed and fuel introduced into the fuel system through inlet 114. Tanks 106 and 108 may be made by any of a variety of materials such as welded steel or heavy gauge rotomolded or blow molded plastic. Cross feed line 110 may similarly be made of a variety of materials such as plastic or rubber hose either by itself or reinforced by a woven fiber mesh, for example.

Figure 2:
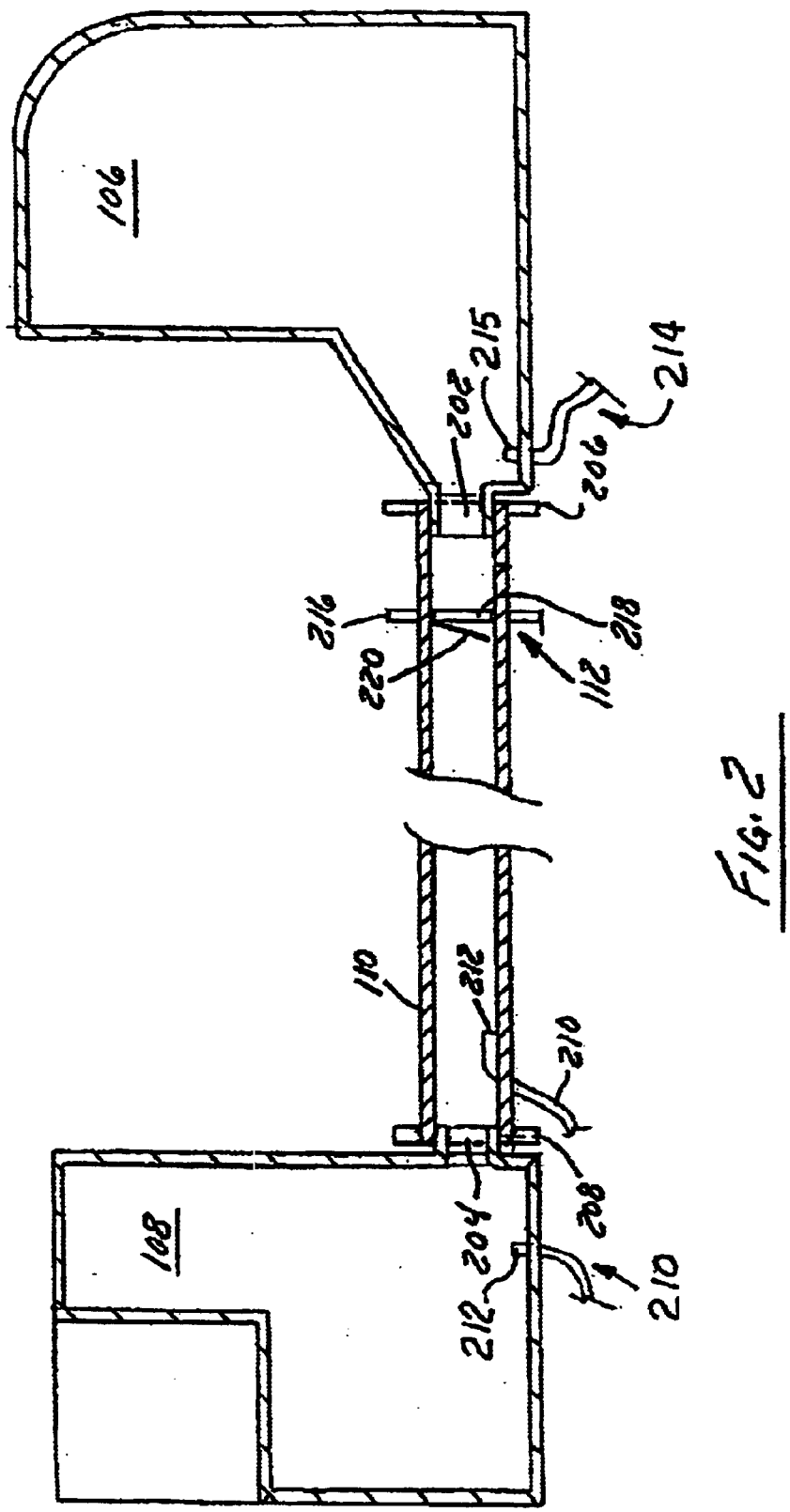
FIG. 2 is a sectional view of the two laterally disposed fuel tanks and the cross feed line of FIG. 1 taken at section 2—2 in FIG. 1.

Referring now to FIG. 2, we can see a cross section through a vertical plane of fuel tanks 106, 108, cross feed line 110, and fuel check valve 112 of FIG. 1. Each fuel tank 106, 108 has a fuel outlet 202, 204 located adjacent to the bottom of each tank. These outlets are generally at the same height above the ground. In this manner, when the vehicle is sitting on level ground fuel will generally pool equally in the bottom of both tanks and in cross feed line 110.

Figure 3:
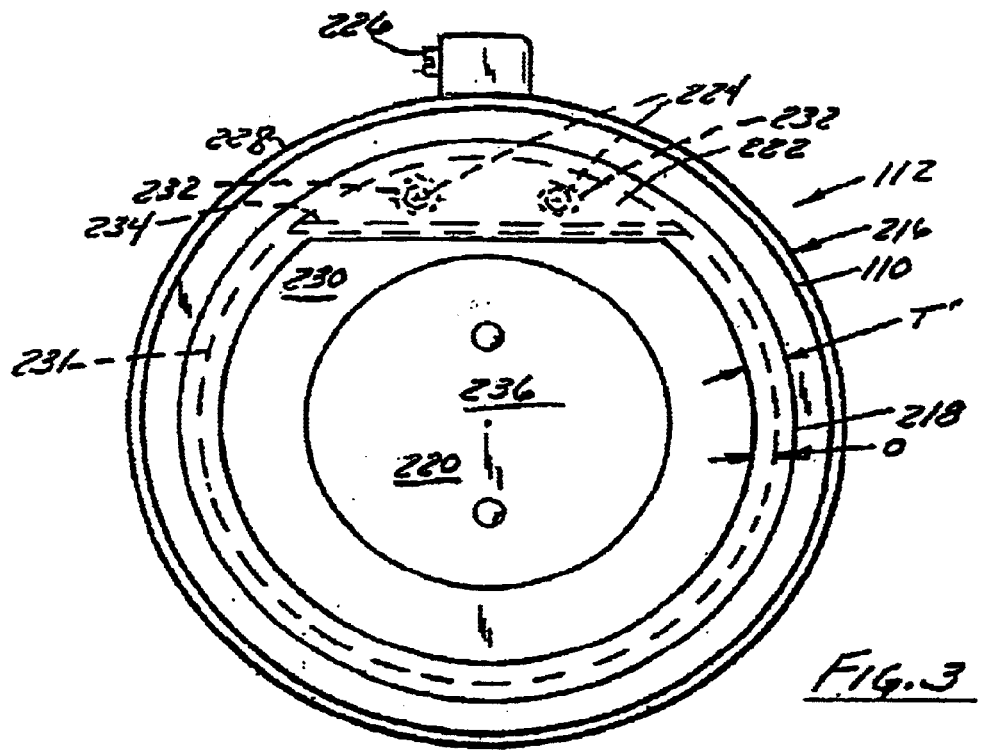
FIG. 3 is an axial view of the cross feed line of FIGS. 1 and 2 taken at section 3—3 in FIG. 1 and showing details of the fuel check valve that is disposed in the cross feed line.

Cross feed line 110 similarly extends generally horizontally to couple fuel outlets 202 and 204. As shown in FIG. 3, cross feed line 110 is generally circular in cross section and is preferably made of a relatively flexible material. It is forced over fuel outlets 202 and 204 at its opposing ends and is secured thereto with hose clamps 206 and 208, respectively. A fuel suction line 210 has an inlet 212 that opens into the interior of fuel tank 108. The distal end of suction line 210 is connected to a fuel pump (not shown) which provides fuel to the engine of the vehicle. This fuel pump is no part of the invention and therefore is not shown in any of the FIGURES. In a similar fashion, a fuel return line 214 is also connected to fuel tank 106 such that it opens into the interior of fuel tank 106. Return line 214 has an outlet 215 that returns fuel from the fuel system of the vehicle back to fuel tank 106 and hence to tank 108.

Check valve 112 is also disposed in cross feed line 110 and, like the inner diameter of cross feed line 110 it has a generally circular outer diameter. Check valve 112 is held in place within cross feed line 110 by clamp 216 which extends around the outer surface of cross feed line 110 at the same longitudinal position as check valve 112 is disposed within cross feed line 110. When clamp 216 is tightened, it compresses cross feed line 110 against the outer circumferential surface of fuel check valve 110 holding it in place within the cross feed line and preventing it from being dislodged.

Check valve 112 is in the form of an annulus or ring 218 and a hinged valve element 220 (shown here as a disk) that is fixed to an upper portion 222 of annulus 218 thereby allowing its bottom portion to swing away from annulus 216 toward the left (in FIG. 2).

Annulus 218 may be formed of any of a variety of materials such as steel, aluminum, brass, or plastic. Disk 220 may similarly be constructed of any of the same materials. In a preferred embodiment, shown here, and more clearly in FIG. 5, disk 220 preferably includes a "living hinge"—a hinge made of flexible polymeric material such as nylon, that can be flexed repeatedly without fatigue.

Figure 4:
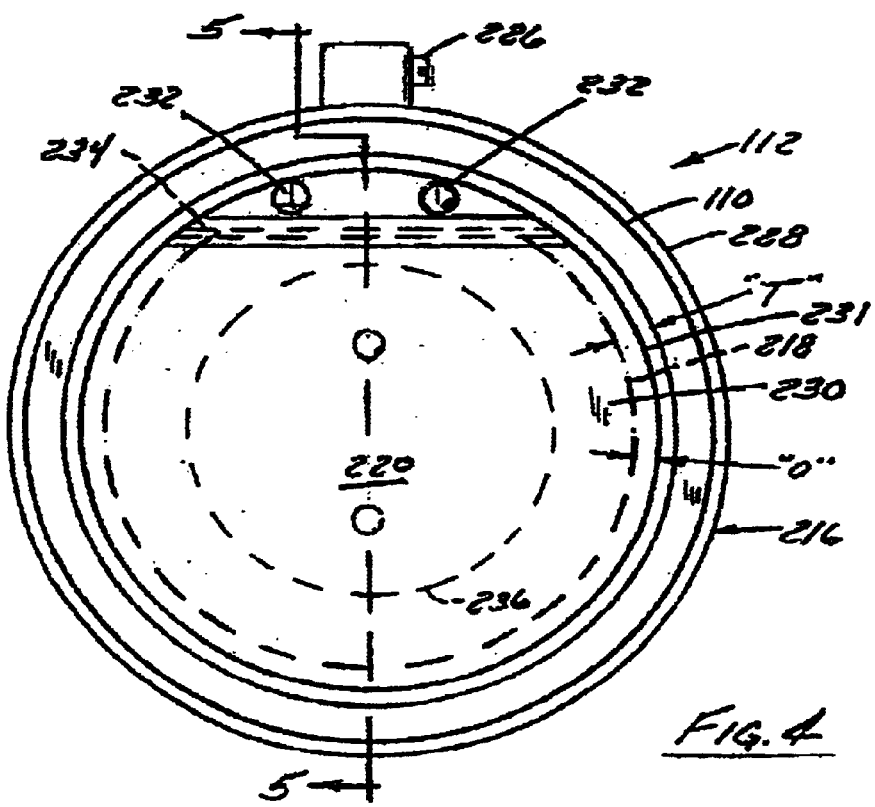
FIG. 4 is an axial view of the cross feed line taken at section 4—4 in FIG. 1 and showing details of the fuel check valve from the opposite direction as shown in FIG. 3.
Figure 5:
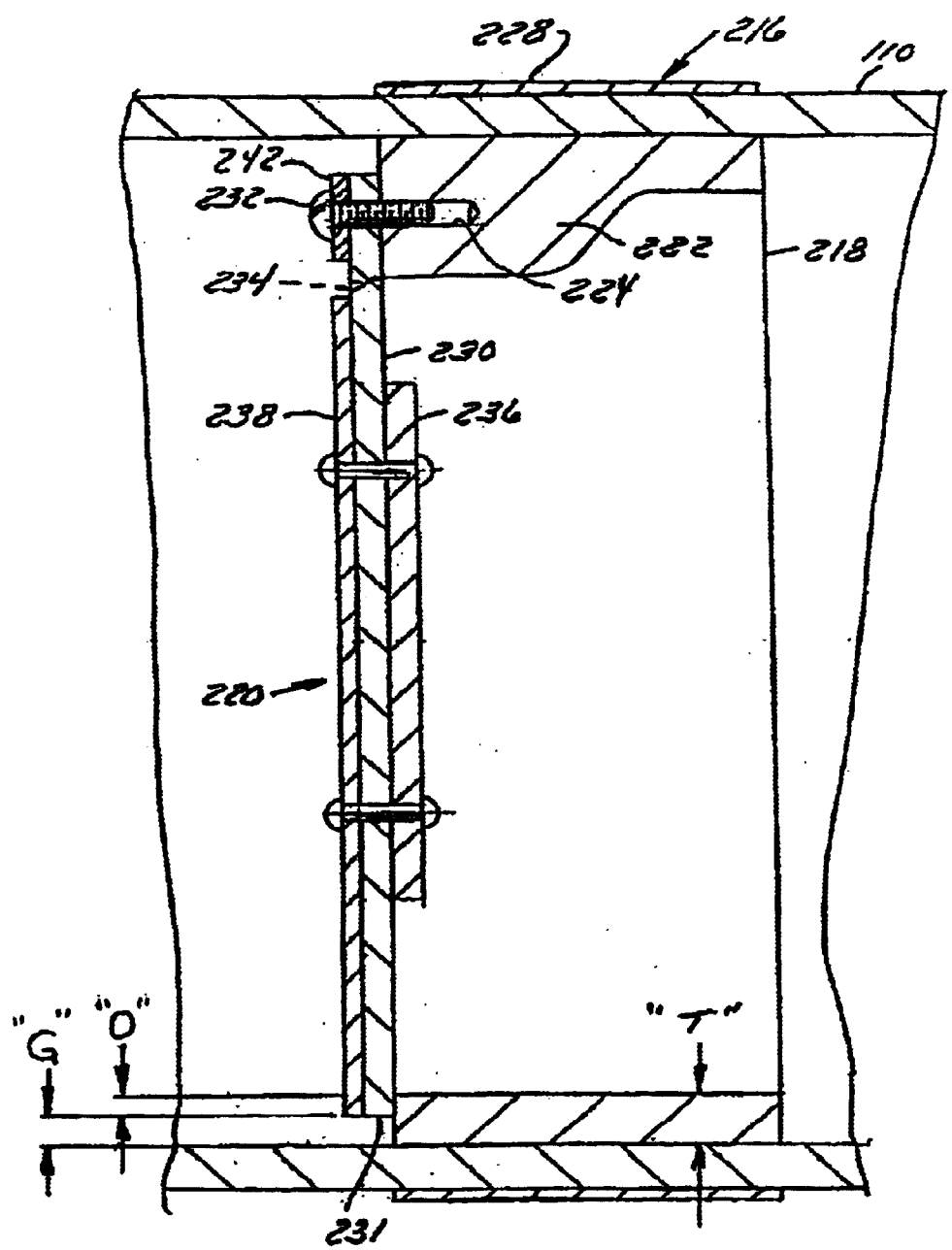
FIG. 5 is a cross sectional view of the fuel check valve of FIGS. 3 and 4 taken at section line 5—5 in FIG. 4.

Referring now to FIGS. 3–5, two end views of fuel check valve 112 are shown in cross section by a vertical cutting plane 5—5 extending through the check valve in a direction parallel to the longitudinal axis of the check valve and perpendicular to the ground.

Annulus 218 is formed as a generally circular band having a constant thickness T over substantially all of its circumference. In order to provide a strong anchoring point for disk 220, upper portion 222 may be thicker that the rest of the annulus as shown best in FIG. 3 to provide a strong anchoring point for the disk. The thickened top portion 222 defines two holes 224 that extend parallel to the longitudinal axis of the cross feed line and annulus 218. These holes are spaced apart with one located near each end of the thickened top portion to provide a relatively broad base of support for disk 220.

In the preferred embodiment, annulus 218 has a width greater than its thickness to allow relatively unrestricted flow through the cross feed line. This however is not essential depending upon the capacity of the tanks and therefore the amount of fuel that would otherwise be trapped in the low tank when traveling on a slope.

The outer diameter of annulus 218 abuts the inner diameter of cross feed line 110. It is held in place by clamp 216, which, as best shown in FIGS. 3 and 4, may be of an adjustable type using a screw 226 that tightens or loosens a band 228 when it is rotated. This type is commonly called a "hose clamp" and is well known in the art. By tightening band 228, cross feed line 110 can be compressed against the outer diameter of annulus 218 thereby holding it in place by frictional forces. Alternatively, permanent type clamps, such as those used to secure rubber boots to constant velocity joints in automobiles may also be used. In these types of clamps, the band is permanently bent or kinked with a special tool to reduce its length and therefore compress it against the outer surface of cross feed line 110.

Disk 220 is comprised of three primary elements. The first of these is a flexible polymeric disk 230 that is generally circular in shape. This disk is preferably made of material that is immune to fuel swelling such as nylon. Disk 230 has an outer diameter 231 slightly greater than the inner diameter of annulus 218 and has a center that is aligned with the center of annulus 218. With this orientation, there is a relatively constant overlap a distance "O" between annulus 218 and disk 230. When valve 112 is closed, the facing surfaces that overlap "O" abut each other and seal against each other to prevent the flow of fuel from tank 108 to tank 106. It is these adjacent and abutting surfaces that define a generally circular valve seal. When opened, the lower portion of disk 220 swings outward and away from annulus 218 separating these two abutting surfaces and permitting fuel to flow there between. The force of gravity acting on the fuel in tank 106 presses against the central portion of disk 220 and forces it to swing open and permit fuel to pass.

Disk 230 includes two holes 233 corresponding in location and size to holes 224 in annulus 218 in an upper portion thereof. Threaded fasteners 232 pass through these holes in disk 230 and into holes 224 in annulus 218 to which they are threadedly engaged, thereby holding the upper portion of disk 230 firmly against annulus 218. In order for disk 230 to swing open and closed, therefore, a flexible portion of polymeric disk 230 here shown as dashed line 234 bends thereby acting as a hinge to permit the lower portion of disk 230 to open and close while the upper portion of disk 230 remains fixed against the upper portion 222 of annulus 218.

Hinged valve element or disk 220 includes two other structures: a pair of stiffeners 236 and 238. These two stiffeners are also thin and generally planar in configuration. They are preferably made of a stronger material than polymeric disk 230 such as brass. Stiffeners 236 and 238 are located on opposing sides of polymeric disk 230 and are fixed together and fixed to polymeric disk 230 by two fasteners 240. These fasteners perform the function of fixing the two stiffeners firmly against opposing surfaces of polymeric disk 230. They are preferably small screws or rivets.

Stiffener 236 is fixed to disk 230 on the annulus-facing side of disk 230. It is generally circular in shape and has an outer diameter smaller than the inner diameter of annulus 218.

Stiffener 238 is fixed to polymeric disk 230 on the side of disk 230 that faces away from annulus 218. It is preferably made of the same material and has the same general configuration as that of stiffener 236. Stiffener 238 terminates below hinge 234 similar to stiffener 236. Stiffener 238 like stiffener 236 also has a generally circular planar configuration with an upper chordal portion removed to define a generally straight line extending parallel to and slightly below hinge 234.

Stiffener 238 preferably has a diameter slightly greater than that of the inner diameter of annulus 218. Indeed, the outer diameter of stiffener 238 is preferably the same as the outer diameter of polymeric disk 230. In this manner, both polymeric disk 230 and stiffener 238 overlap annulus 218 by a distance "O".

The outer diameter of stiffener 238 is slightly smaller than the inner diameter of line 110. A gap "G" is thereby provided between the inner diameter of line 110 and the outer diameter or edge 231 of stiffener 238. Gap "G" is dimensioned sufficiently to permit the valve element or disk 220 to swing open and closed while preventing stiffener 238 from contacting and therefore interfering with cross feed line 110 over its preferred range of motion.

An upper portion of stiffener 238 is removed (FIG. 3) in the vicinity of the hinging portion of polymeric disk 230 indicated by dashed line 234. Stiffener 238 preferably extends relatively closely to this hinge line thereby providing stiffness to polymeric disk 230 over substantially all of the surface area of disk 230.

In the preferred embodiment, the shape of stiffener 238 is in the form of a circle with an upper chord cut off thereby defining an upper straight edge that is adjacent to hinge 234 and is spaced generally a constant distance away from hinge 234.

By providing this overlap between stiffener 238 and annulus 218, the force of fuel in tank 108 acts against the stiffener which distributes this load outwardly and presses against the outermost portion of polymeric disk 230 defined by overlap O. Stiffener 238 presses against this overlapping portion of polymeric disk 230 and communicates the force of the fluid acting on stiffener 238 directly through the overlapping portion of disk 230 to annulus 218. Without this stiffener, and assuming a relatively and flexible polymeric disk 230, the force of fuel would act directly on the surface of polymeric disk 230 causing it to bend in the middle and be pushed entirely through annulus 218 thereby permitting the leakage of fuel. It is stiffener 238 that provides the necessary rigidity and permits force to be transferred only to the outer edge of polymeric disk 230.

While this is the preferred embodiment, it should be clear that polymeric disk 230 could be molded or machined to inherently have a greater thickness and hence strength in its central region, or it could be made of much thicker material initially and hinge 234 be machined or molded to provide a thinner and hence more flexible region. Either of these two approaches would obviate the need for separate stiffeners or only stiffeners that are used in a central region and do not extend out to the edge of the polymeric disk.

The top portion of the polymeric disk as mentioned above is attached through two holes 233 to the top portion of annulus 218 by threaded fasteners 232. The heads of threaded fasteners 232 that attach the top portion of disk 230 to annulus 218 are not fixed directly to and through disk 230, however. A small reinforcing plate 242 is placed against the side of disk 230 that faces away from annulus 218. This plate 242 also has two holes. These holes are aligned with the corresponding holes in disk 230 and holes 224 in the upper portion 222 of annulus 218. Threaded fasteners are inserted first through plate 242 then, through the corresponding and aligned holes in the upper portion of disk 230, and then into a corresponding and aligned holes 224 in annulus 218. Threaded fasteners 232 are preferably pan head screws. The heads of fasteners 232 press against plate 242 causing plate 242 to press against a wider area of polymeric disk 230 and compress this wider area firmly against the upper portion 222 of annulus 218. In this manner, plate 242 and the upper portion 222 of annulus 218 serve to compress substantially the entire width of polymeric disk 230 between them, thereby holding an entire upper chord of polymeric disc 230 fixed against the upper portion 222 of annulus 218.

Plate 242 is preferably in the form of a thin planar sheet defining a chord of a circle. It has a lower edge that is generally straight and extends horizontally slightly above hinge 234 and parallel to hinge 234. Its upper surface is a circular arc that is adjacent to, and concentric with, but does not abut the inner diameter of the cross feed line 110.

While the embodiments illustrated in the FIGS. 1–5 and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A flapper valve system comprising:
    a flapper valve disposed in a cross-feed line, the flapper valve comprising a polymeric annulus having a width in an axial direction greater than a thickness in a radial direction; and a generally planar valve element including an upper portion fixed to the annulus and a lower portion configured to pivot with respect to the annulus, thereby providing a fluid passageway between the annulus and the valve element; and
    an annular clamp extending around an outer surface of the cross-feed line and circumferentially clamping the cross-feed line such that the flapper valve is frictionally held in place in the cross-feed line.

2. The valve of claim 1, wherein the upper and lower portions compose a substantially planar and circular polymeric sheet, and a polymeric hinge portion is formed integral with and couples the upper and lower portions.

3. The valve of claim 2, wherein the valve element further includes at least one planar stiffener sheet fixed to the lower portion of the circular polymeric sheet.

4. The valve of claim 3, wherein the stiffener sheet is substantially coplanar with the lower portion and is fixed to one side of the lower portion.

5. The valve of claim 4, wherein an upper portion of the annulus has a radial thickness greater than a lower portion of the annulus, wherein the greater thickness is sufficient to anchor the upper portion of the circular polymeric sheet to the annulus.

6. The valve of claim 5, wherein the upper portion of the circular polymeric sheet is coupled to the upper portion of the annulus by at least one fastener.

7. The valve of claim 6, further comprising a second stiffener sheet fixed to the lower portion of the polymeric sheet on an opposing side from the stiffener sheet.

8. The valve of claim 7, wherein an outer edge of the second stiffener sheet overlaps the inner diameter of the annulus on one end thereof to thereby compress an outer circumferential edge of the polymeric sheet against the one end of the annulus.

* * * * *